3,151,162
PARAFFIN WAX AMINES
Ernest F. Pevere and James K. Truitt, Beacon, N.Y., assignors to Texaco Inc., New York, N.Y., a corporation of Delaware
Filed Nov. 6, 1958, Ser. No. 772,260
3 Claims. (Cl. 260—583)

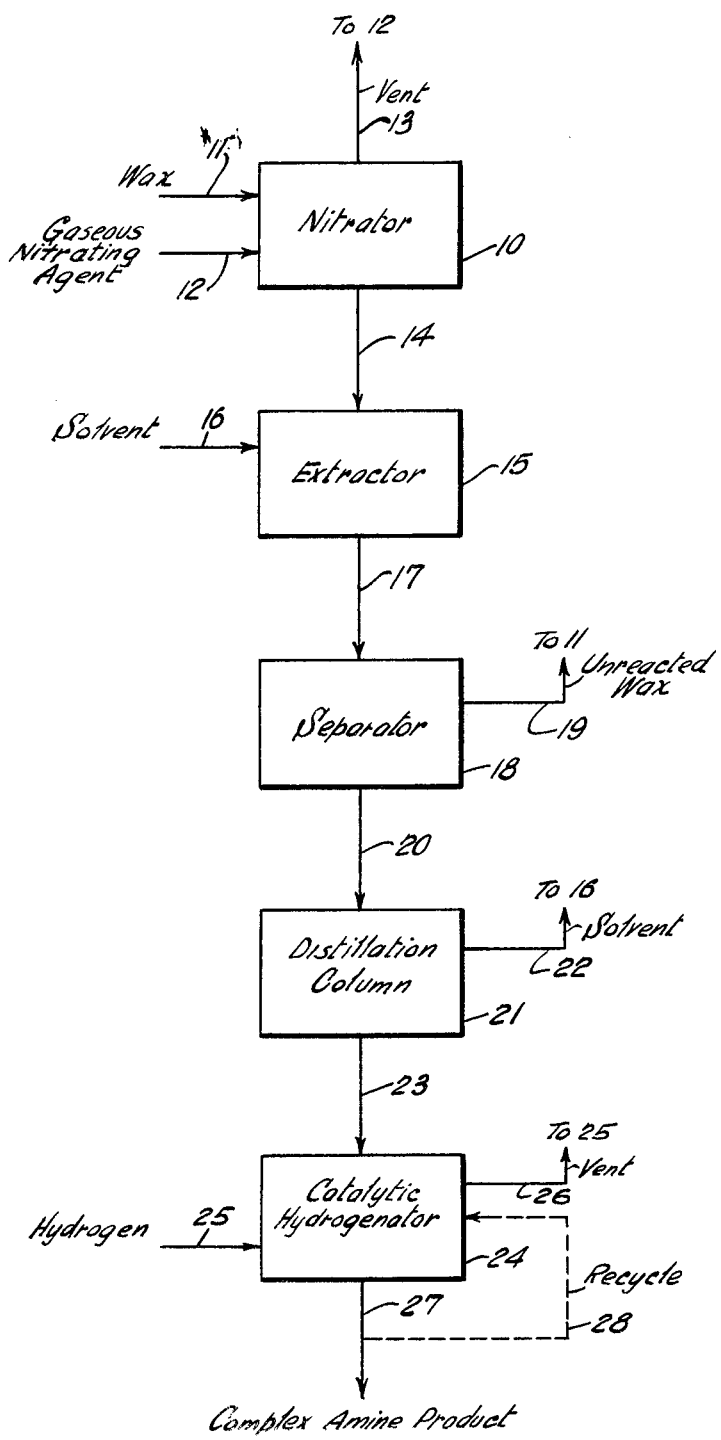

This invention relates to a novel complex mixture of macrocrystalline paraffin wax primary amines and a process of producing same. The invention also pertains to novel corrosion inhibited compositions having said amines incorporated therein and to a method of preventing corrosion of metals therewith.

An object of this invention is to provide an effective corrosion inhibitor which is compatible with the fuel characteristics of petroleum liquid hydrocarbons.

Another object of this invention is to provide an efficient low temperature process of monoaminating a macrocrystalline paraffin wax without the substantial formation of polyamines or oxidation by-products such as organic acids, ketones, aldehydes, esters and lactones.

An additional object of this invention is to provide a process in which the intermediate product is selectively separated from the unreacted macrocrystalline paraffin wax thereby substantially facilitating the conversion of the intermediate product to the desired primary amines as well as insuring relatively high yields of final product and the effective utilization of reactants.

Still another object of this invention is to prevent the corrosion of metals such as iron and steel which are in contact with petroleum liquid hydrocarbons by incorporating in said liquids the complex mixture of amines produced by the novel process of this invention.

The process of our invention can be broadly described by referring to the single figure of the drawing which is a flow sheet diagram of the process steps. The macrocrystalline paraffin wax is charged to nitrator 10 through line 11. Gaseous nitrating agent is also charged to nitrator 10 through line 12. The reaction mixture is heated and the desired pressure and temperature maintained by conventional means. The reaction gases are vented from line 13 and are primarily nitrogen oxides. If desired, these waste gases may be recycled to nitrator 10 through line 12 after purification and reconcentration by conventional methods.

The crude nitrowax intermediate product is withdrawn through line 14 into extractor 15. Selective solvent is introduced into extractor 15 through line 16 to extract the nitrowax from the crude product. The resultant solution or slurry (depending on the extraction temperature) is withdrawn through line 17 to filter separator 18 and allowed to reach ambient temperature. The resultant unreacted paraffin wax filter cake is withdrawn through line 19 and can be recycled to nitrator 10 through line 11, if desired.

The filtrate is withdrawn through line 20 to vacuum distillation apparatus 21 and the selective solvent is removed through line 22 where it can be subsequently condensed and recycled to extractor 15 through line 16.

The nitrowax residue remaining after solvent distillation is withdrawn through line 23 to platinum catalyst containing hydrogenator 24. Hydrogen gas is introduced into hydrogenator 24 through line 25 and preferably in counter-current contact with the nitrowax when hydrogenation is continuous. The excess hydrogen and gaseous by-products are vented through line 26 and preferably recycled to line 25 for reason of economy. The maintenance of temperature and pressure during the hydrogenation is accomplished by conventional methods and means. The amine product is withdrawn in a batch or continuous manner from line 27 depending on the nature of the hydrogenation. A continuous hydrogenation is preferred. If extensive hydrogenation is desired, all or part of the product can be recycled to hydrogenator 24 through lines 27 and 28. Hydrogenator 24 is preferably a reactor having the catalyst in pelleted form fixedly packed therein.

PARAFFIN WAX CHARGE

The deoiled paraffin wax contemplated herein as a charge material is derived from the wax distillate (paraffinic distillate) fraction of paraffinic crude oils. The wax distillate fraction consists of a mixture of light bodied oils ranging from 40 to 300 seconds Saybolt Universal viscosity at 100° F. and various waxy fractions of about the same boiling range as the light bodied oils. The paraffin wax is macrocrystalline in structure, is a complex mixture of predominantly saturated straight chain hydrocarbon molecules, each molecule containing from 18 to 32 carbon atoms, has a melting point ranging between 80° and 156° F. and an average molecular weight of between 254 and 450.

By the term "deoiled" we mean an oil content of less than 5% and preferably less than 1%. Deoiled macrocrystalline paraffin waxes meeting the specification of less than 5% oil content are available as by-products in the manufacture of low pour lubricating oils, e.g., a pour point of less than 25° F. or below. The deoiled waxes are obtained from distillate lubricating oil fractions by solvent dewaxing or by pressing and sweating and usually contain less than 1% oil. A preferred charge material for the process of the invention is obtained by solvent dewaxing a distillate oil which has been solvent refined with solvents such as furfural and phenol. A macrocrystalline paraffin wax having a melting point between 125–127° F., an average carbon chain length of 24, an average molecular weight of 338 and an oil content of less than 0.5% obtained by solvent dewaxing a lube oil distillate is an example.

NITRATION STEP

The nitration of macrocrystalline paragn wax is conducted above the melting points of said wax at a temperature of between about 100–175° F., preferably between 140–160° F., and under a pressure of between about 0–50 p.s.i.g., preferably atmospheric pressure.

The gaseous nitrating agent contemplated herein is a mixture of nitrogen dioxide and molecular oxygen, the two gaseous components being pre-mixed in a volume ratio of between about 1:10 and 10:1, preferably between 1:2 and 2:1. The gaseous nitrating agent is bubbled through the melted paraffin wax at a rate of between about 0.1 and 5 cu. ft. nitrating agent/lb. wax/hr., preferably at a rate between 0.5 and 1.5 cu. ft./lb. wax/hr.

The nitrogen dioxide component of the aforementioned nitrating agent is actually an equilibrium mixture of nitrogen dioxide and nitrogen tetraoxide. At temperatures below about 68° F., only the nitrogen tetraoxide exists and above about 284° F., the nitrogen dioxide is exclusively present. At approximately 140° F. the equilibrium mixture is formed of equal mol parts of the dioxide and tetraoxide. We, therefore, include within the definition of nitrogen dioxide its equilibrium counterpart, nitrogen tetraoxide.

The aforementioned nitrating conditions are all important for the production of a predominantly mononitroparaffin wax to the substantial exclusion of the undesirable oxidative reactions and products. A surprising feature of our method is the relatively low temperature under which our nitration is conducted. Heretofore, nitration of paraffins with nitrogen dioxide was only though to be feasible at temperatures of the order of about 400 to 1000° F. We have found by mixing molecular oxygen with nitrogen doxide in the prescribed amounts, under the prescribed pressures and nitrating gas rate, it is possible to operate at temperatures barely above the melting point of the macrocrystalline paraffin wax, thereby minimizing the production of undesirable oxidation products and polynitro compounds.

The nitration of the paraffin wax is generally ended after the wax registers a weight increase of between about 5 and 15%. The crude nitration product is then withdrawn from the nitrator and mixed with a solvent selected from the group consisting of 1-nitropropane, 2-nitropropane and mixtures thereof at a solvent to crude nitrowax weight ratio of between about 1:1 and 10:1, preferably between 2:1 and 5:1. Preferably, the resultant mixture is heated to between about 80 and 150° F. with the mixing continued until solution of the crude nitroparaffin wax product is essentially complete. In the preferred procedure the heated solution is then allowed to cool either artificially or naturally to room temperature or below, e.g., 70° F., to allow crystallization. In any case the resultant slurry is filtered to remove the undissolved and/or recrystallized solid which upon analysis was found to be the unreacted paraffin wax. The filtrate is distilled at a reduced pressure, preferably between 10 to 15 mm. Hg, at a temperature of less than 150° F. to remove the nitropropane and to prevent explosion. The residue remaining is the purified nitrowax which is predominantly a mononitration product. If desired, the nitrowax may be further purified by dissolving in a liquid lower alkane such as n-pentane with the resulting solution being successively washed with an alkaline substance such as aqueous ammonium hydroxide and water and subsequently evaporating off the lower liquid alkane.

In the above extraction step we have found nitropropane to be an extremely effective selective solvent for the separation of the nitrowax from unreacted paraffin wax with a single extraction separating over 99% of the nitrowax from the crude product. Such a discovery lends substantial economy to the novel process since both the unreacted paraffin wax and nitrowax are recoverable in a highly purified state with the result that the unreacted wax can be immediately recycled to the nitration step without further treatment and the nitrowax may be passed directly to the hydrogenation step without necessitating additional concenration and purification. In addition, the distilled nitropropane can be re-utilized in the extraction step.

AMINATION

After completion of the extraction the nitrowax is passed directly into a high pressure reactor containing platinum catalyst. The quantity of catalyst employed should be between 0.5 and 5%, preferably between 1 and 2% based on the weight of the nitrowax in the reactor. The platinum catalyst may be either in its free form or impregnated in a catalyst support. Some examples of the catalyst support which may be employed are asbestos, pumice and silica gel. We prefer to employ asbestos impregnated with platinum salts which have been reduced in situ to the metallic form. When a platinum catalyst is used in conjunction with a catalyst support, the platinum should constitute between 3 and 30% of the catalyst-support combination, preferably between 5 and 20%. Although the physical form of the final catalyst may range from a powder to 1 inch diameter pebbles, a cylindrical pellet shape of ⅛ to 1 inch diameter and ⅛ to ½ inch length is preferred.

With the introduction of the nitrowax into the reactor, hydrogen is also introduced. Although any amount of hydrogen will hydrogenate at least some of the nitrowax, best yields are obtained when the hydrogen is kept in mol excess to the nitrowax in the reactor for any given time. The temperature is brought to and maintained at between about 125 and 200° F., preferably between 140 and 160° F., and should be above the melting point of the nitrowax. The hydrogen is maintained under a pressure of between about 2,000 and 10,000 p.s.i.g. in the reactor, preferably between 3,000 and 5,000 p.s.i.g. The reaction mixture is preferably maintained in a state of agitation to insure thorough mixing of the nitrowax, hydrogen and catalyst. In a batch operation the prescribed pressure and temperature are preferably maintained until the pressure droppage in the reactor is no longer in evidence. In a continuous operation flow and recycle rates should be controlled to give a contact time of hydrogen and nitrowax of between about 1 minute and 1 hour.

After hydrogenation is complete, the reaction mixture is removed from the apparatus. If desired, the resulting macrocrystalline paraffin wax amine may then be purified by any suitable method. For example, by dissolving the crude reaction product in a liquid lower alkane such as n-pentane, filtering the resultant solution to remove the catalyst and subsequently distilling off n-pentane, a purified residue of a complex mixture of macrocrystalline paraffin wax primary amines is left which predominate in monoamines.

CORROSION INHIBITION WITH WAX AMINES

The macrocrystalline paraffin wax primary amine complex produced by the previously described novel process has been found to be effective in preventing corrosion of metal bodies containing and/or transporting petroleum hydrocarbon liquids such as crude oil, gasoline, kerosine, diesel fuel and furnace oil when incorporated therein in an amount between about .005 and 1%, preferably between .009 and 0.1% based on the weight of the hydrocarbon liquid.

Rusting frequently occurs in pipelines, storage tanks, ship tanks, well tubing and other ferrous metal structures of the petroleum industry. This corrosion is contributed to or caused by bodies such as water, brine, oxygen, carbon dioxide, hydrogen sulfide, lower molecular weight organic acids and combinations thereof which are normally found in the presence of refined and unrefined petroleum liquids.

The wax amine complexes of this invention are believed to prevent corrosion by forming a tough chemisorbed layer on the metal surface with which they come into contact to the exclusion of petroleum liquids and all corrosive bodies normally associated therewith.

The novel wax amine complex may be added to the petroleum liquid to be inhibited, either in undiluted or in solution form. It is preferable to add the inhibitor as a concentrated additive solution in solvent, which solvent is also soluble in the petroleum liquid to be inhibited. Such a solvent may be a light petroleum fraction such as benzene, toluene, kerosene or light diesel and gas oil. A preferable solvent is an untreated gasoline distillate having a gravity of about 30° API, a flash point of about 160° F. and an ASTM Distillation 50% Point of about 475° F. Portions of about 1 part by weight of amine to between 2–10 parts solvent are satisfactory although other proportions may be used successfully. Solvent is advantageous because the paraffin wax amine complexes are either highly viscous liquids or solids at room temperature and, therefore, cannot be easily introduced directly in uniform proportions without cutting them back.

Our invention is further illustrated by the following specific examples. Examples I–III concern preparation of a specific example of our novel aminated product. Example IV shows the superior corrosion inhibiting effect in petroleum liquids of said product.

*Example I.—Nitration*

To a stainless steel reactor fitted with a gas inlet tube at the bottom and a gas outlet tube at the top hereof, 453 grams of a solid macrocrysalline paraffin wax was added, said wax having an average molecular weight of 338, an average carbon atom chain length of 24, a melting point between 125–127° F. and an oil content of less than 0.5%. The wax was heated to a molten condition and maintained at a temperature of 150° F. under atmospheric pressure during the reaction. A stream of a 50–50 mol mixture of nitrogen dioxide and oxygen was passed through the gas inlet tube and bubbled into the liquefied wax at a rate of 0.5 cu. ft./hr. for a period of 20 hours whereupon the gas stream was stopped and the reaction mixture was allowed to cool to room temperature. The crude reaction product was a yellow solid weighing 488 grams.

*Example II.—Purification of Nitrowax*

To a Pyrex flask 190 grams of the crude product of Example I and 570 grams of 1-nitropropane were added and the mixture was warmed on a hot plate to 100° F. with stirring until solution was complete. The solution was allowed to naturally cool to room temperature (70° F.) during which time a white solid crystallized. The resultant slurry was vacuum filtered on a Whatman #4 filter paper held in a Büchner funnel. The filter cake had the appearance and melting point of the original macrocrystalline paraffin wax reactant and an elemental analysis found it contained 99.9% carbon and hydrogen, 0.7% oxygen and .03% nitrogen, which confirms that the filter cake was essentially the unreacted portion of the paraffin wax reactant.

The filtrate from the above filtration was vacuum distilled at 10–15 mm. Hg pressure and at a temperature of 150° F. (maximum) to remove the nitropropane leaving 51 grams (a yield of 27% based on the crude product of Example 1) of a solid yellow waxy residue. An elemental analysis of the residue found it to contain 86.9% carbon and hydrogen, 9.8% oxygen and 4.3% nitrogen. The theoretical percentage of carbon plus hydrogen, oxygen, and nitrogen in the intermediate mononitro product of the starting macrocrystalline paraffin wax reactant is 88.7%, 8.4% and 3.9%, respectively. A comparison between the theoretical and actual percentages shows our nitroparaffin wax product is essentially of a mononitro composition.

In addition, a comparison between the elemental analysis of the filter cake and wax residue establishes that the nitropropane selectively extracted over 99% of the nitrated wax from the crude nitration product of Example I.

*Example III.—Amination*

The macrocrystalline nitroparaffin wax of Example II was further purified by dissolving said wax in 150 grams of n-pentane at room temperature and successively washing the resultant solution with 20 cc. portions of 5% aqueous ammonium hydroxide and water, then substantially removing the n-pentane by heating the solution to 95° F. Forty-six (46) grams of the thus refined nitroparaffin was charged to a stainless steel bomb together with 5 grams of supported catalyst, the supported catalyst consisting of 90% fine asbestos, impregnated with 10% platinum. The bomb was then flushed with molecular hydrogen gas and brought to a hydrogen pressure of 4000 p.s.i.g. and a temperature of 150° F. For a period of 7 hours the bomb pressure was maintained between 3500 and 4000 p.s.i.g. as well as the maintenance of the 150° F. bomb temperature. At the end of the 7-hour period, the reaction product was withdrawn from the reactor and dissolved in 150 grams of n-pentane at room temperature (70° F.). The resultant solution was passed through a Whatman #4 filter paper to remove the catalyst. The filtrate was then heated to 95° and the n-pentane was evaporated off leaving 43 grams of a yellow oily liquid having an amine odor. Analysis of the product indicated that 25% of the nitrogenous compounds had been reduced to macrocrystalline wax amines, the monoamine predominating.

*Example IV.—Corrosion Inhibition*

This example specifically illustrates the remarkable corrosion reducing effect in petroleum hydrocarbon liquids of the novel macrocrystalline paraffin wax amine complex produced by the novel process. The subsequent data compares the corrosion inhibiting properties of the novel complex to the first stage nitrowax and to uninhibited solutions.

In the corrosion test employed, a mixture of 300 ml. of gasoline and 30 ml. of distilled or synthetic sea water is shaken at a temperature of 80° F. for 3 hours with a cylindrical steel specimen completely immersed therein. The additives employed in the gasoline was the nitro product of Example II and the amine product of Example III. Otherwise, conditions and materials are as described in ASTM Test D–665–54.

The inhibitor dosage percent in the following test data is based on the weight of the gasoline:

| Inhibitor Dosage, Wt. percent | Gasoline plus Distilled Water | Gasoline plus Synthetic Sea Water |
| --- | --- | --- |
| None | Severe rusting | Severe rusting. |
| Product of Example II: | | |
| 0.01 | Moderate rusting | Severe rusting. |
| 0.1 | Light rusting | Moderate rusting. |
| Product of Example III: | | |
| .001 | Moderate rusting | Severe rusting. |
| .01 | No rusting | No rusting. |

All percentages, parts, and ratios recited in specification and claims are based on weight unless otherwise described.

Obviously, many modifications and variations of the invention as hereinbefore set forth may be made without departing from the spirit and scope thereof and therefore only such limitations should be imposed as are indicated in the appended claims.

We claim:

1. A complex mixture of macrocrystalline paraffin wax primary amines, the product of contacting a macrocrystalline paraffin wax derived from the wax distillate fraction of a paraffinic crude oil, said paraffin wax having average molecular weight between 254 and 450, a melting point between 80 and 156° F., from 18 to 32 carbon atoms per molecule, and an oil content of less than 5% with a gaseous nitrating agent at a gas rate from about .01 to 5 cu. ft./lb. wax/hr., at a temperature of between about 100 and 175° F., at a pressure between about 0 and 50 p.s.i.g., said nitrating agent consisting essentially of a mixture of nitrogen dioxide and oxygen in a volume ratio of between about 1:10 to 10:1, mixing the resultant crude nitrowax product with a solvent in a solvent to crude nitrowax weight ratio of between about 1:1 and 10:1, said solvent selected from the group consisting of 1-nitropropane, 2-nitropropane and mixtures thereof, filtering the resultant slurry and vacuum distilling the filtrate at a pressure between 10 and 15 mm. Hg and a temperature less than 150° F., contacting the vacuum distillation residue with molecular hydrogen under a hydrogen pressure of between about 2,000 and 10,000 p.s.i.g. at a temperature between about 125 and 200° F. in the presence of between about 0.5 and 5% platinum catalyst, subsequently separating the resulting complex mixture of macrocrystalline paraffin wax primary amines from said catalyst.

2. A process of producing a complex mixture of macrocrystalline paraffin wax primary amines comprising contacting a macrocrystalline paraffin wax derived from the wax distillate fraction of paraffin crude oil, said paraffin having average molecular weight between 254 and 450, a melting point between 80 and 156° F., from 18 to 32 carbon atoms per molecule, and an oil content of less than 5% with a gaseous nitrating agent at a gas rate from about .01 to 5 cu. ft./lb. wax/hr., at a temperature of between about 100 and 175° F., at a pressure between about 0 and 50 p.s.i.g., said nitrating agent consisting essentially of a mixture of nitrogen dioxide and oxygen in a volume ratio of between about 1:10 to 10:1, mixing the resultant crude nitrowax product with a solvent in a solvent to crude nitrowax weight ratio of between about 1:1 and 10:1, said solvent selected from the group consisting of 1-nitropropane, 2-nitropropane and mixtures thereof, filtering the resultant slurry and vacuum distilling the filtrate at a pressure between 10 and 15 mm. Hg and a temperature less than 150° F., contacting the vacuum distillation residue with molecular hydrogen under a hydrogen pressure of between about 2,000 and 10,000 p.s.i.g. at a temperature between about 125 and 200° F. in the presence of between about 0.5 and 5% platinum catalyst, subsequently separating the resultant complex mixture of macrocrystalline paraffin wax primary amines from said catalyst.

3. A process of producing a complex mixture of macrocrystalline paraffin wax primary amines comprising contacting a macrocrystalline paraffin wax derived from the wax distillate fraction of paraffinic crude oil, said paraffin wax having an average molecular weight between 254 and 450, a melting point between 80 and 156° F., from 18 to 32 carbon atoms per molecule and an oil content less than 1% with a gaseous nitrating agent at a gas rate of between 0.5 and 1.5 cu. ft./lb. wax/hr. at a temperature between 140 and 160° F., and at atmospheric pressure, said nitrating agent consisting essentially of a mixture of nitrogen dioxide and oxygen in a volume ratio of between 1:2 and 2:1, subsequently mixing the resultant crude nitrowax product with a solvent at a temperature between about 80 and 150° F. in a solvent to crude nitrowax weight ratio of between 2:1 and 5:1 said solvent selected from the group consisting of 1-nitropropane, 2-nitropropane and mixtures thereof subsequently cooling and filtering the resultant slurry and vacuum distilling the filtrate at a pressure between 10 and 15 mm. Hg and a temperature less than 150° F., contacting the vacuum distillation residue with a mol excess molecular hydrogen to a hydrogen pressure of between 3,000 and 5,000 p.s.i.g. at a temperature between 140 and 160° F. in the presence of about 1% platinum catalyst, subsequently separating the resultant complex mixture of macrocrystalline paraffin wax primary amines from said catalyst.

References Cited in the file of this patent

UNITED STATES PATENTS

| | | |
|---|---|---|
| 2,160,058 | Covert | May 30, 1939 |
| 2,174,498 | Johnson | Sept. 26, 1939 |
| 2,240,558 | Ellis | May 6, 1941 |
| 2,393,573 | Sommer | Jan. 22, 1946 |
| 2,448,910 | Reamer | Sept. 10, 1948 |
| 2,607,665 | Duncan | Aug. 19, 1952 |
| 2,755,301 | Nelson et al. | July 17, 1956 |
| 2,793,943 | Moore | May 28, 1957 |
| 2,823,235 | Graham et al. | Feb. 11, 1958 |

FOREIGN PATENTS

Groggins: "Unit Processes in Organic Synthesis," page 75, 5th ed. (1958).